United States Patent [19]

Melchior

[11] Patent Number: 4,995,348

[45] Date of Patent: Feb. 26, 1991

[54] TWO-STROKE INTERNAL COMBUSTION ENGINES AND PROCESS FOR OPERATING SAID ENGINES

[76] Inventor: Jean F. Melchior, 126Bld du Montparnasse, 75 014 Paris, France

[21] Appl. No.: 376,146

[22] Filed: Jul. 7, 1989

Related U.S. Application Data

[63] Continuation of Ser. No. 67,918, filed as PCT FR86/00375 on Nov. 5, 1986, published as WO87/03043 on May 21, 1987, abandoned.

[30] Foreign Application Priority Data

Nov. 6, 1985 [FR] France ................................ 85 16430

[51] Int. Cl.⁵ ............................................. F02B 75/02
[52] U.S. Cl. ............................ 123/65 VD; 123/90.15; 123/65 R
[58] Field of Search ........ 123/65 VD, 65 BA, 65 EM, 123/90.15, 90.16, 90.18, 65 R

[56] References Cited

U.S. PATENT DOCUMENTS

| | | |
|---|---|---|
| 2,097,883 | 11/1937 | Johansson . |
| 2,313,017 | 3/1943 | Hurum . |
| 3,911,873 | 10/1975 | Dave ............................ 123/90.15 |
| 4,162,662 | 7/1979 | Melchior ...................... 123/65 VD |
| 4,224,905 | 9/1900 | von Seggern et al. ........ 123/65 VC |
| 4,288,988 | 9/1982 | Curtil ............................ 60/605 |
| 4,404,805 | 9/1983 | Curtil ............................ 60/606 |
| 4,445,467 | 5/1984 | Westerman et al. ......... 123/65 R |
| 4,499,872 | 2/1985 | Ward et al. .................. 123/90.18 |
| 4,530,318 | 7/1985 | Semple ......................... 123/90.17 |
| 4,616,605 | 10/1986 | Kline ............................ 123/65 VD |
| 4,732,118 | 3/1988 | Tanahashi et al. ........... 123/65 VD |

FOREIGN PATENT DOCUMENTS

| | | |
|---|---|---|
| 1121406 | 1/1962 | Fed. Rep. of Germany . |
| 58-152139 | 9/1983 | Japan . |
| 2136875 | 9/1984 | United Kingdom ........... 123/73 C |

Primary Examiner—David A. Okonsky
Attorney, Agent, or Firm—Larson & Taylor

[57] ABSTRACT

An engine, operating in accordance with the two-stroke cycle, is characterized in that the intake and exhaust timing elements are valves (7, 9). The control device for the valves is responsive to a parameter such as the speed of rotation of the engine, the comsumption of fuel, the value of a super-charging pressure, or the difference between the intake and the exhaust pressure. The control device is used for varying the angular position in the cycle of operation of the opening and the closure of the valves (7, 9) to obtain the introduction of a sufficient quantity of fresh air in the work chamber in the least favorable condition of operation, in particular by opening the intake during a period of increase in volume of the chamber.

58 Claims, 2 Drawing Sheets

PRIOR ART

TWO-STROKE INTERNAL COMBUSTION ENGINES AND PROCESS FOR OPERATING SAID ENGINES

This application is a continuation of application Ser. No. 07/067,918, filed Aug. 3, 1987, and now abandoned.

The present invention relates to internal combustion engines which comprise at least one work chamber of variable volume limited by a piston and provided with at least one air inlet and at least one gas outlet and which operates in accordance with the two-stroke cycle.

The engines concerned by the invention are preferably, but not exclusively, supercharged by a turbo-compressor unit constituted by a turbine actuated by the exhaust gases of the engine and mechanically connected to a supercharging compressor whose outlet communicates with the air inlet or inlets of the or each work chamber.

It is known that the operation of an internal combustion engine which comprises at least one work chamber of variable volume, i.e. a chamber delimited by a moving means (such as a piston) co-operating with a fixed unit (such as a cylinder) always has two distinct stages, namely:

a stage termed a closed stage during which the work chamber is isolated from the air intake and gas exhaust systems by the simultaneous closed state of intake and exhaust timing elements and in the course of which there are effected the compression, the combustion and the expansion furnishing the essential part of the positive work received by the shaft of the engine, and an open stage of exchanges of gas during which the work chamber communicates with the intake and/or exhaust systems.

In all cases of engines of this type, this open stage comprises a period of discharge, of the pressure prevailing in the or each work chamber. This discharge period is brought about by the putting of the work chamber in communication, at the end of the expansion stroke of the closed stage, with solely the exhaust system by the opening of the exhaust timing element. This discharge period is often termed "exhaust blast" or "pulse" in the English language. During this period, owing to the fact that the pressure prevailing in the work chamber which is increased by the heating of the gases brought about by the combustion is much higher than the pressure prevailing in the exhaust system (in a ratio usually on the order of 2 to 3), there is produced an expansion which is first sonic and then subsonic in the course of which a large part (more than one half) of the mass of gas contained in the work chamber is transferred to the exhaust system.

In a four-stroke engine, after the discharge period, at least a part of the remainder of the gases is expelled to the exhaust by the piston, fresh air being thereafter aspirated by the latter during the period of increasing volume of the work chamber. On the other hand, in a two-stroke engine, the discharge of the gases remaining in the work chamber after the discharging period and their replacement by fresh air are achieved in an aerodynamic manner by the state of simultaneous opening of the intake and exhaust timing elements during a period termed a scavenging period. The effectiveness of this scavenging is determinant for the efficiency and performances of a two-stroke engine. Various scavenging systems have already been proposed in this respect and in particular the use, in a two-stroke engine, of valves for providing the intake elements and exhaust elements.

However, for this scavenging to be effectively achieved, the pressure prevailing directly upstream of the work chamber or chambers, i.e. in the intake system, must be on an average higher than that prevailing directly on the downstream side in the exhaust system during the scavenging at all the operating conditions of the engine. Two-stroke engines therefore required up to the present time pressure generating means to maintain, during said scavenging period, this pressure difference at a value on an average positive.

These pressure generating means may be formed either: (1) by the moving piston itself employed in a double-acting manner and co-operating, for example, with a chamber provided below its lower side (for example, on cross-head pistons), or with the fixed case of the main shaft and associated with adequate timing elements to ensure the prior compression of the air before its introduction into the work chamber, or (2) by an auxiliary booster element mechanically connected to the main shaft, such as a volumetric vane compressor or a compressor of the ROOTS type, or driven independently of the rotation of the main shaft, for example electrically.

From the economic point of view, these various pressure generating means have a disadvantageous effect both on the dimensioning of the engine with its auxiliaries and on the consumption of energy when these means are employed.

In the case of two-stroke engines, supercharged by turbo-compressors, the positive pressure difference between the upstream and downstream sides of the work chamber necessary for the scavenging of this chamber during the scavenging period is ensured naturally by the supercharging turbo-compressor when the engine operates at high power. Indeed, when the compressor operates with a sufficient pressure ratio, the expansion ratio of the turbine required for the stable driving of the turbo-compressor will be all the weaker as the overall efficiency of the latter and the temperature of the gases available at the outlet of the work chambers will be higher. Thus, a modern turbo-compressor having, for example, an overall efficiency of 60% and whose turbine is fed with gases under 4 bars at 600° C. will deliver air under 5 bars from the atmosphere at 20° C., the work chamber being thus naturally subjected to a positive pressure difference of 1 bar.

On the other hand, when these supercharged two-stroke engines operate at low power, the enthalpy available at the exhaust of the work chambers is insufficient to ensure that the supercharging turbine be capable of driving the compressor at such speed that the aforementioned pressure difference remains positive. Consequently, without accessory means, the engine would stop owing to this inversion of the difference of the pressures which would prevent the reintroduction of fresh air into the work chamber. A fortiori, the starting up of the engine would be impossible.

These accessory means may be of the pressure generating type described above. They may also be of the type enabling the turbo-compressor to operate independently of the engine at a speed precluding the inversion of the difference of the pressures on the upstream and downstream sides of the work chamber. Thus, for example, a bypass conduit may be provided connecting the outlet of the compressor to the inlet of the turbine and associated with an auxiliary combustion chamber, and governor means may be provided for preventing the speed of the turbo-compressor from dropping below a previously determined threshold value. As a alternative, there may be added to the turbo-compressor a supplementary turbine wheel which is fed with a fluid under pressure, such as for example a Pelton hydraulic turbine.

These known accessory means are however complex and costly and result in an increase in the fuel consumption when they are employed.

An object of the invention is therefore to provide two-stroke engines without an external scavenging device other than the supercharging turbo-compressor, when it exists, for starting up and operation at low power.

Another object of the invention is to ensure the introduction of fresh air in a natural manner into the or each work chamber of two-stroke engines, in particular, but not exclusively, supercharged engines when they operate at low power and on the occasion of their starting up and without the addition of the aforementioned accessory means.

Another object of the invention is to utilize, at least partly, the energy present on the downstream side of the or each work chamber in order to facilitate this introduction of fresh air.

Another object of the invention is to facilitate the acceleration of the rotor of a supercharging turbo-compressor, when it is provided, by increasing the energy available on the downstream side of the or each work chamber, upon the opening of the exhaust timing element.

Another object of the invention is to improve the torque curve of the engine.

The invention provides an internal combustion engine having at least one work chamber of variable volume limited by a piston in a cylinder devoid of lateral ports and operating in accordance with the two-stroke cycle, this engine being preferably, but not exclusively, supercharged by a turbo-compressor whose gas inlet of the turbine communicates with the gas outlet of the work chamber and whose air outlet of the compressor mechanically driven by the turbine communicates with the air inlet of the work chamber, in which engine the air inlet and the gas outlet of the work chamber are provided with intake and exhaust valves sychronized with the rotation of the shaft of the engine, characterised in that, as the engine is devoid of an external scavenging device for starting up and operation at low power, said intake and exhaust valves are actuated by control means adapted to be capable of varying in operation the angular position seen from the shaft of the engine, of their opening and their closure as a function of at least one parameter of operation of the engine, said control means being responsive to said parameter of operation of the engine and being adapted to advance the start of the opening of the intake valve but in maintaining it later than by preferably at least 20° than the start of the opening of the exhaust valve, when starting up and operating at low power, relative to normal operating conditions, so as to obtain at all operating conditions the introduction of a sufficient quantity of fresh air into the or each work chamber.

According to the invention, the means controlling the intake and exhaust valves permit a modification of their angular positions of the start of the opening and closing within a wide angular range.

The field of the invention therefore excludes timing elements of the inactive type found in the quasi-totality of known two-stroke engines and constituted by ports provided in the fixed wall of the cylinders and cyclically uncovered by the piston in the course of its travel. In this case, indeed, the angular opening and/or closing positions are necessarily determined once and for all, relative to the position of the moving piston, and symmetrical relative to the position of the piston corresponding to the maximum volume of the work chamber, termed bottom dead centre (BDC), said ports ensuring the communication between the work chamber and the exterior.

Particularly advantageously, the valves may be arranged as described in French patent No. 2,338,385 filed on 15 January 1976 or U.S. Pat. No. 4,162,662.

By parameter of operation of the engine is meant, in respect of the invention, a detectable parameter related to the operation of the engine and capable of assuming at least two values, one corresponding to an operation of the engine during which the value of the pressure difference between the upstream or intake side of the chamber and the downstream or exhaust side remains positive and sufficient to ensure the good operation of the engine so that the latter may run in the usual manner of a conventional two-stroke engine under normal operating conditions, while the other corresponds to an operation of the engine during which it might be feared that said pressure difference would be insufficiently large or become negative or during which said pressure difference simply does not exist, as in the case of an engine which has stopped.

This parameter may be, for example:

the value of the supercharging pressure in the case of a supercharged two-stroke engine, the quantity of fuel introduced per cycle into the work chamber or chambers, the speed of rotation of the main shaft of the engine, the temperature prevailing in the exhaust manifold, the effective value of the difference between the intake and exhaust pressures, and, preferably, between the pressures prevailing directly on the upstream side and directly on the downstream side of the work chamber.

The control means, rendered responsive by a detector to said parameter and controlling the operation of the intake and exhaust valves, may be of any type. They may, for example, be of mechanical type and driven directly by the main shaft of the engine through a kinematic chain, for example in the case of camshafts. In this case, mechanical or other regulating means are provided for modifying the angular opening and closing positions of the intake and exhaust valves.

The aforementioned control means may also be of the electric, hydraulic or pneumatic type, and are synchronized with the rotation of the main shaft of the engine, regulating means responsive to said parameter also permitting the modification of the angular opening and closing position of the intake and exhaust valves.

Thus, owing to the invention, the engine operates as any two-stroke engine of the various known types which may or may not be supercharged, within the normal operating range. On the other hand, its operation is modified so as to effectively ensure or replace the scavenging when it operates outside said normal operating range.

This may be achieved by utilising principally a part of the travel of increasing volume of each work chamber, that is, the air intake travel, by varying in a corresponding manner the angular opening and closing positions of the intake and exhaust valves.

For this purpose, the opening of at least the intake valve is markedly advanced in the cycle, for example, in the vicinity of the mid-travel of the moving piston of the work chamber, and in modifying consequently the timing for the exhaust valve. There is thus obtained an increase in the quantity of fresh air available for the combustion and, by advancing the closure of the intake and exhaust valves, an increase in the volumetric compression ratio which moreover facilitates, if desired, a self-ignition in the preferred case of a diesel engine.

Moreover, the advance of the exhaust in the cycle increases the energy of the exhaust blast which occurs at higher pressure and temperature. In the case of a two-stroke engine turbo-charged by a turbo-compressor unit whose turbine, which drives the compressor, is itself driven by the exhaust gases, the exhaust system may then advantageously have a very direct connection between the exhaust valve and the turbine wheel. It is then found that, at very low speed, the blast pulses produce a slow rotation of the turbo-compressor unit which, without resulting in a supercharging of air of the engine, causes a ventilation of the work chamber which is sufficient to discharge the combustion gases therefrom and replace them with fresh air.

This direct connection may be simply ensured by using exhaust pipes bent in a regular manner and opening into the exhaust manifold whose passage section, adapted to the large flows of high speeds, offers no obstacle to the blast pulses in an axial direction of the manifold, the latter communicating, without interposition of a distributor, with a turbine wheel.

In a particular embodiment of the invention, the angular positions may be so arranged that the intake and exhaust valves are not, at least approximately, simultaneously in the effective opening state.

In another embodiment of the invention, the intake and exhaust valves may be simultaneously in the open state, unidirectional means being then provided in the exhaust for limiting or preventing any possible reflux of gas from the exhaust system to the or each work chamber.

In this other embodiment of the invention, checkvalves or other mechanical non-return means may be used in the exhaust but there may also be used either the effect of inertia of the gas column displaced in the pipe connecting the gas outlet of the work chamber to a gas manifold, or an ejection effect produced by the gas pulse coming from a work chamber on the emptying of another work chamber in a scavenging situation, which requires an number of work chambers preferably higher than three.

Advantageously, when the inertia of the exhaust gases is used, means may then be provided for a unidirectional flow in the exhaust system, and in particular in the pipes ensuring the communication between the gas outlets of the work chamber or chambers and a gas manifold, said unidirectional means being, for example, constituted by sufficiently long fixed exhaust pipes, the outlet of which is preferably oriented in the same direction as the flow of the gases in the manifold.

The ejection effect produced by the gas pulse may also be used, in particular when the number of work chambers is larger than three, by providing, for ensuring the communication between the gas outlet of the or each work chamber and the gas manifold, pipes having a shape of a convergent/divergent nozzle whose outlet is oriented in the same direction as the flow of the gases in the manifold and preferably concentric with the manifold.

In the latter case, the case manifold may have a substantially constant passage section sufficiently small that, under nominal operating conditions, the rate of flow of the gases at the downstream end of said manifold exceeds the Mach number 0.4. The downstream outlet of the gas manifold could communicate with the inlet of the turbine of the turbo-compressor of a supercharged engine, through a diffuser which reduces the flow rate to a Mach number less than 0.4. As a alternative, the downstream outlet of the gas manifold may directly communicate with the gas inlet of the turbine of a supercharging turbo-compressor unit whose gas distribution volute is so arranged that the gas speed is not reduced between the exit of the manifold and the entry into the rotor of the turbine.

The invention also provides processes for operating the two-stroke engines defined above.

A first manner of operating is characterised by the fact that,
(a) when the aforementioned parameter or parameters have values which correspond to the normal or nominal operating condition(s) of the engine, the engine operates in the known manner according to the two-stroke cycle which comprises:
 a compression-combustion-expansion stage during which the intake and exhaust valves are closed,
 a pulsating exhaust period at the end of the expansion stage during which only the exhaust valves are open,
 a scavenging period during which the intake and exhaust valves are simultaneously open and in the course of which the combustion gases are at least partly replaced by fresh air under the effect of the difference of the pressures, which is on average positive, prevailing on each side of the or each work chamber;
(b) on the other hand, when the operating parameters have values which correspond to conditions of operation in which the engine would be incapable of running or suitably operating, the angular position of the opening of the valves is advanced relative to the position of maximum volume of the or each work chamber so that the communication of the latter with the intake system of the engine may occur during, or principally during, a part of the period of increasing volume of the work chamber, it being possible to arrange the pipes organising the communication between the work chamber and the gas manifold, in particular if there exists a stage during which the intake and exhaust valves are simultaneously open, so that no substantial reverse flow can occur in the direction from the gas manifold to the or each work chamber.

The angular positions of operation of the intake and exhaust valves may be modified suddenly when the parameter passes through a predetermined threshold value. Optionally, a plurality of successive threshold values may be provided for a plurality of sudden modifications of the position of said valves.

As an alternative, said angular positions may be modified in accordance with a continuous or quasi-continuous function of the aforementioned parameter for progressively varying between the position corresponding to the favorable conditions of operation to the position corresponding to the least favorable condition of operation.

Note that two-stroke engines are already known in respect of which only the intake or only the exhaust occurs through a valve having an adjustable timing, the exhaust or the intake being then achieved through fixed ports uncovered by the piston.

As opposed to this, the invention permits the temporary obtainment of a four-stroke effect by the opening of the intake valve which is anticipated but follows on the opening of the exhaust valve. Now, this effect is impossible with engines having an intake port whose intake opening is fixed and therefore cannot be anticipated (U.S.-A-2,097,883, except FIG. 6) and with engines having an exhaust port whose intake opening may, it is true, be advanced but no longer follows on that of the exhaust (U.S.-A-2,097,883, FIG. 6).

More precisely, in normal operation of the engine according to the invention, the useful stroke (of compression) of the engine according to the invention is at least 50% of the total stroke of the or each piston. In the mode of operation when starting up or at low power, the intake stroke is at least 50% of the total stroke and the compression stroke may be on the order of 100% of this stroke, the angular stagger EO-IO being greater than or equal to 20% (the degrees of rotation of the crankshaft).

With known two-stroke engines, having intake ports and exhaust valves having a variable timing, it is not possible to increase the intake stroke owing to the fixed intake ports and, for the same reason, the compression stroke can only be partly increased, i.e. without it being possible to reach 100%.

With known two-stroke engines having exhaust ports and intake valves having a variable timing, it is possible to increase the intake stroke but at the expense of the EO (exhaust opening)—IO (intake opening) stagger. The exhaust blast is therefore discharged to the intake which results in a stifling of the engine. Further, owing to the fixed exhaust ports, the compression stroke cannot reach 100%.

It has moreover been proposed to operate the engine alternately in accordance with a two-stroke cycle and in accordance with a four-stroke cycle, i.e. without a continuous or gradual variation between the two modes of operation (see JP-A-58 152 139).

The invention also concerns a process for starting up such an engine in which the engine is operated, when starting up, in accordance with one of the aforementioned processes, characterised in that, as the engine is supercharged, the supercharging turbo-compressor unit is speeded up prior to the starting up of the engine.

Further advantages and features of the invention will be apparent from the following description, which is given by way of a non-limiting example, with reference to the accompanying drawing, in which:

FIG. 6 represents a diagrammatic view of another engine designed to operate in accordance with FIG. 4.

Figure 1:
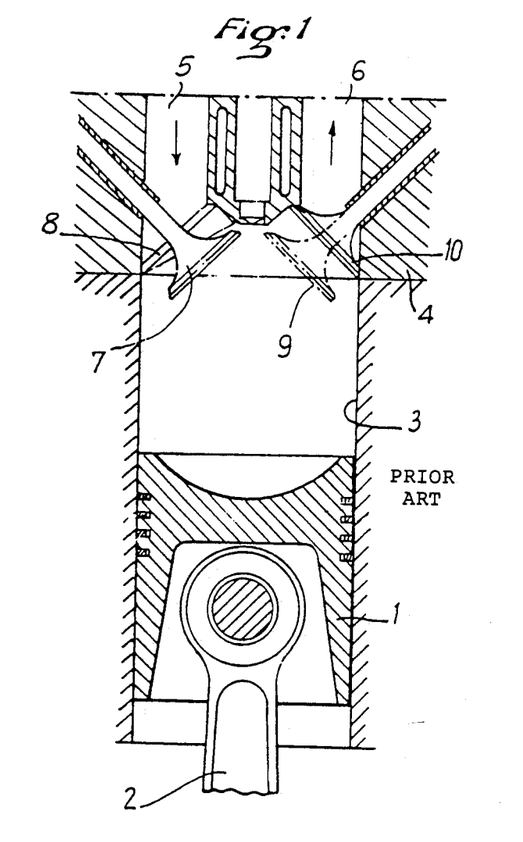
FIG. 1 represents a diagrammatic view of a work chamber, known per se, of a two-stroke engine according to the invention.
Figure 2:
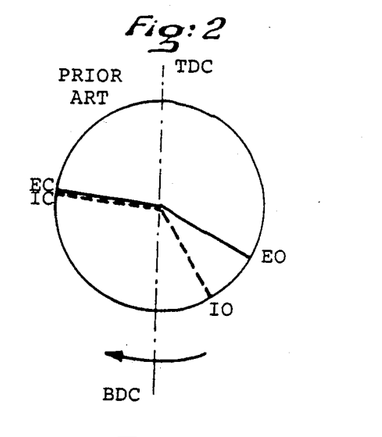
FIG. 2 represents the angular diagram of the openings and closures of the intake and exhaust valves according to a known two-stroke cycle of this engine.

Reference will first of all be made to FIGS. 1 and 2.

The engine in respect of which the invention will be described is a two-stroke engine having one or more work chambers of the type described in said French patent No. 2,338,385 or U.S. Pat. No. 4,162,662. This work chamber represented in FIG. 1 comprises a moving part, namely a sliding piston 1 with its piston rod 2, and a fixed part, namely a cylinder 3 provided in its upper part with a cylinder head 4. The latter has an intake passage 5 and an exhaust passage 6 capable of being opened and closed by an intake valve 7 co-operating with a seat 8 and by an exhaust valve 9 co-operating with a seat 10. The cylinder 3 is therefore devoid of ports in its lateral wall, the seats 8 and 10 being placed in the cylinder head 4.

The other parts of the engine, namely the main shaft, the camshaft, the set of rocker arms, will not be described in more detail since they are conventional. The inclination of the valves and their size are arranged in the best possible manner, as for example in said French patent No. 2,338,385, so as to achieve, under a normal condition of operation, a performance which is as efficient as possible.

The diagram of FIG. 2 represents the known mode of operation of this engine. This diagram, whose angular origin is the bottom dead centre, BDC, is travelled through in the clockwise direction. The angular positions are the following:

Exhaust opening EO: $-60°$
Exhaust closure EC: $+100$
Intake opening IO: $-30°$
Intake closure IC: $+100°$ Thus it can be seen that, after a downward stroke of 120° from the top dead centre, the exhaust valve 9 opens (EO), the intake valve 7 being still closed during 30° corresponding to the blast period. After the intake opening IO, the blast stage is followed by a scavenging period of 130° during which the air charge is renewed under the aerodynamic effect of the positive pressure difference found between the intake passage 5 and the exhaust passage 6 of the work chamber. The closed stage lasts thereafter 200° and is divided up, in the considered example, in an asymmetrical manner with a compression stroke proper of 80° corresponding to a volumetric compression ratio of 8/1, while the combustion - expansion stroke lasts 120° and corresponds to a volumetric expansion ratio of 12.9/1.

This very dissymmetrical cycle permits in the known manner the obtainment of high efficiency associated with a specific power which is also high.

Such a timing diagram may be obtained in the known manner in particular with the aid of a camshaft mechanically connected to the main or crankshaft and directly or indirectly co-operating with the valves and their elastically yieldable return means. The co-operation between the camshaft and the valves may be mechanical (push-rods, rocker arms, etc.) or achieved by any other means such as a hydraulic transmission, etc.

It may also be obtained by control means easy to vary in angular position, such as hydraulic or pneumatic jacks or electromagnetic jacks.

According to the invention, these control means are so arranged as to be capable of varying, in the course of operation of the engine, the angular positions of opening and/or closure of the intake and exhaust valves with large angular variations.

As an example, the connection between the camshaft and each valve may include variable adjustment means (hydraulic variation of clearances, for example, or displacement of the axes of the rocker arms, etc.);

or the connection between the cam and the camshaft or between the cam and the main shaft of the engine may also be variable in a manner known per se;

camshafts may also be used whose cams have a double cam profile and are capable of changing from one profile to the other in the course of operation by a translation of the camshaft;

in the case of a direct control of the valves by hydraulic, pneumatic or electromagnetic jacks, the angular open and closed position of the valve may be varied by piloting means known per se, using, for example, detectors of the position of the shaft of the engine.

Figure 3:
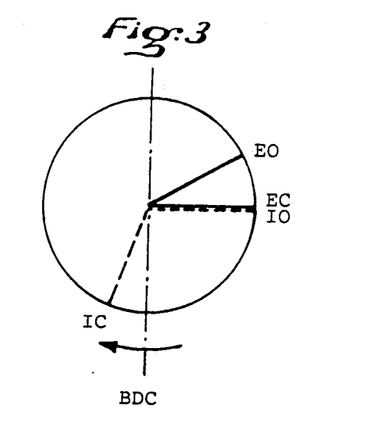
FIG. 3 represents a view of the diagram when the engine according to one embodiment of the invention operates at low power.

Reference will now be made to FIG. 3 in respect of which a first manner of carrying out the invention will now be described.

According to the invention, the engine described by way of example operates in accordance with the two-stroke cycle of FIG. 2 as long as a parameter of operation of the engine is beyond a certain threshold. This parameter may be, for example, the speed of rotation of the crankshaft. When this speed of rotation drops below this threshold, the means controlling the valves according to the invention immediately cause the modification of the angular opening and closing positions of the intake and exhaust valves according to FIG. 3. In the latter, the d.c. angles (degree of rotation of the crankshaft) are the following:
EO: −120°
EC: −90°
IO: −90°
IC: +20°

Thus it can be seen that the opening of the exhaust valve 9 (EO) is advanced 60° toward the top dead centre and lasts only 30° during which the partial discharge of the burnt gases occurs in the form of a blast during the discharge period caused by the expansion following on the opening of the exhaust valve 9. At the end of these 30°, the exhaust valve 9 is closed (EC).

In any case, the angular stagger (seen on the crankshaft) between IO and EO, which is equal to 30° in this example, is greater than the limit of 20° which had been fixed above.

The scavenging period is therefore eliminated and replaced by a period of intake of fresh air upon the opening of the intake valve 7 (IO) which occurs at the same time as the closure of the exhaust valve 9 (EC), this aspiration period lasting 110° which corresponds, in volume, to one half of the maximum volume of the work chamber and, in mass, to a proportion of ⅔ of fresh air, which is quite sufficient to burn the quantity of fuel corresponding to the idling condition of operation.

After the closure of the intake valve (IC), there occurs the compression stage then, close to the top dead centre (TDC), the combustion, and the cycle recommences.

As the intake and exhaust are never simultaneously open, the level of pressure, prevailing in the exhaust manifold no longer plays a part. Thus, the engine designed in this way, even if it is not supercharged, will be capable of starting up and operating in a stable manner when idling.

It will moreover be noted that the compression stroke starts in the vicinity of the bottom dead centre BDC and that, consequently, the volumetric compression ratio is brought to an increased value of 15.6/1 (instead of 8/1), which ensures the self-ignition of the air-fuel mixture even with an atmospheric aspiration as concerns a diesel engine.

In the first embodiment just described, the timing diagram of FIG. 3 may be easily realized if there are employed means for directly controlling the valves by hydraulic or electromagnetic jacks. Indeed, it will be possible when the speed of rotation of the crankshaft will be below the aforementioned threshold value, to obtain high angular speeds of opening and closure of the valves and in particular of the exhaust valves 9. This speed of opening and closure may be still further increased with the use of hydraulic connecting elements between the jack and the valve, these connecting elements, associated with known hydraulic timing means, permitting a curtailing or shortening of the rise of the valve.

If a conventional valve control (camshaft co-operating with elastic control means) is used, the timing diagram of FIG. 3 could be sometimes more difficult to realize, in particular if the speeds are relatively high, since the raising and lowering cam for the closing valve will have to have a particularly steep slope.

In the case of an engine having a camshaft, the embodiment which will now be described with reference to the diagram of FIG. 4 could therefore be preferred.

In this embodiment, when the speed of rotation drops below the fixed threshold, the camshaft is offset 60° rearwardly, i.e. in the counterclockwise direction, so that the illustrated diagram is obtained in which:
EO: −120°
EC: +40°
IO: −90°
IC: +40°

As in the embodiment of FIG. 3, the angular stagger between IO and EO is 30°. However, contrary to the engine illustrated with reference to FIG. 3, the blast period is followed by a mixed period starting at the intake opening IO where the intake valve 7 and exhaust valve 9 are simultaneously open.

It is necessary to avoid a possible harmful reflux of the exhaust gases coming from the exhaust manifold during the descending stroke of the piston if, for example, the pressure in the exhaust manifold in higher than the intake pressure, which would prevent a stable idling of the engine. Thus it is arranged, in this embodiment, to mount in the exhaust unidirectional means such as, for example, check-valves directly on the downstream side of the exhaust valve or valves in the pipe connecting the or each work chamber to the exhaust manifold.

These valves may be replaced by any equivalent means, such as aerodynamic diodes provided in said pipes.

Figure 4:
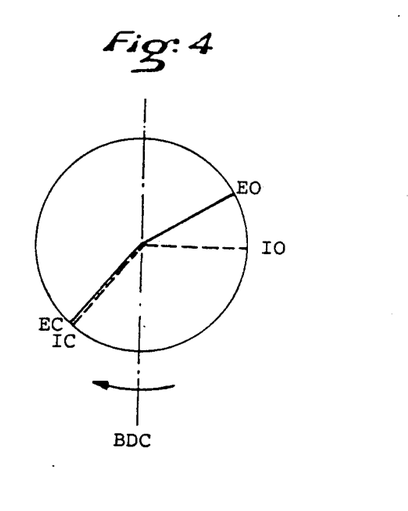
FIG. 4 represents the diagram when another embodiment of the invention operates at low power.

In another embodiment of the invention, the diagram of the intake and exhaust valves is, for example, the same as that of FIG. 4. Thus there is a period, at least during a part of the descent of the piston, during which the intake valve 7 and exhaust valve 9 are simultaneously open.

According to a first alternative of this other embodiment of the invention, the reflux is avoided by making use of the inertia effect of the gas column put in motion in the pipe connecting the gas outlet of the or each work chamber to the gas manifold, by the pulse produced upon the discharge (blast) of the gases at the end of the downstroke upon the opening of the exhaust valve 9.

This effect, which is well known under the name Kadenacy effect, requires a special arrangement of the pipes (in diameter and in length) to be optimum.

Figure 5:
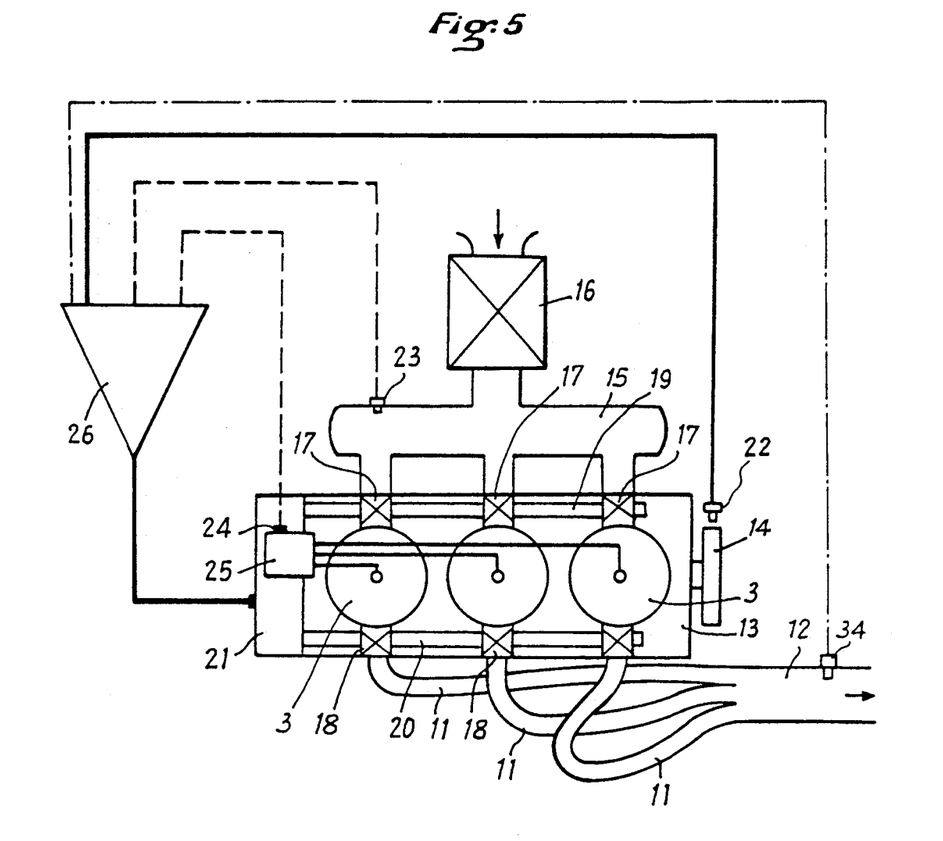
FIG. 5 represents a diagrammatic view of an engine designed to operate in accordance with FIG. 4.

If the pipes 11 are arranged to open out in the direction of the flow of the gases in a rectilinear exhaust manifold 12, as seen in FIG. 5, there are then obtained, even at the very low speeds of the engine and in the absence of the Kadenacy effect, exhaust blasts in the form of pulses which freely pass through the exhaust manifold 12. In the case where the engine comprises, at the end of the manifold 12, a turbine 29 of a turbo-compressor unit 28-29, as is represented in FIG. 6, these blasts are sufficient (in particular if no obstacle, such as an elbow, volute or distributor, is disposed in front of the turbine wheel) to produce, somewhat by a Pelton turbine effect, a rotation of the turbo-compressor unit. This ensures in the intake manifold 27, a ventilation of the chambers 3 allowing an assured and flexible operation of the engine at the lowest condition of operation and in particular when starting up.

There is also seen in FIG. 5 the diagram of the engine according to the invention which comprises, in the block 13 in which the engine shaft or crankshaft 14 rotates, three work chambers or cylinders 3 fed by an air manifold 15 whose inlet includes an air filter 16. The intake valve 17 and the exhaust valve 18 are driven, through camshafts 19, 20 by control means 21. This engine includes a detector 22 of the speed of rotation of the shaft 14, a detector 23 of the air intake pressure, a detector 24 of the quantity of fuel introduced per cycle into the work chambers 3 through fuel introducing means 25 and optionally a detector 34 of the exhaust temperature. Electronic means 26 for regulating the control means 21 are responsive to the detectors 22 and/or 23 and/or 24 and/or 34 and, as a function of the result of a comparison between the value of the simple or complex parameter detected by the detector or detectors and a threshold value regulate the state of the control means 21 for the normal two-stroke operation or the modified operation according to the invention.

In another alternative of this embodiment of the invention, advantage is taken of the ejection effect produced by the pulse coming from a work chamber or cylinder 3 on the emptying of another work chamber in a scavenging situation. This requires that the number of work chambers be greater than 3 bearing in mind the angular duration of this procedure.

Such an engine is represented in FIG. 6 in which elements similar to those of FIG. 5 carry, unless otherwise indicated, the same reference numbers.

The represented engine comprises five work chambers 3 fed with air by an air intake manifold 27 receiving supercharging air under pressure from a compressor 28 of a turbo-compressor unit whose turbine 29 is driven by the exhaust gases, the compressed air being first of all cooled by an air cooler 30. The exhaust system 31 uses the gas ejection effect.

This ejection effect may be obtained with known means of the type of those described in French patents Nos. 2,378,178, 2,415,200, 2,478,736 or U.S. Pat. Nos. 4,288,988 and 4,404,805.

Such an arrangement represented in FIG. 6 requires the following constructive characteristics:

A—an extremely short connection of small volume between the outlet of the work chambers and the gas manifold 31 by means of pipes 32 in the form of convergent or convergent/divergent nozzles whose outlet is oriented in the direction of the flow in the gas manifold.

The very small volume and the restriction of the passage section of these pipes 32 have for effect to favour the recovery of the energy available in the work chambers at the beginning of the exhaust blast stage. The pressure in the pipe indeed rises very rapidly as soon as the exhaust valve opens and in this way approaches the pressure prevailing in the work chamber, which considerably reduces the loss of energy by the throttling when passing through said exhaust valve.

The useful energy available in the work chambers at the end of the expansion is consequently preserved to the maximum extent.

The acceleration in the convergent pipes 32 and the orientation of the latter in the direction of flow in the gas manifold 31 enables this potential energy to be effectively converted into kinetic energy which contributes to the acceleration of the gas column flowing in said manifold 31.

B—the grouping of the exhaust of a plurality of work chambers in a gas manifold 31 whose diameter is small relative to the diameter of the piston (generally of the order of one half).

The dimensioning of the manifold may be expressed as follows:

$$Se = (n.Sp) \times \frac{Vp}{Ve} \times \frac{\rho'}{\rho_5} \times a,$$

in which relation:
Se = section of the gas manifold
Sp = transverse surface area of each piston
n = number of pistons
n.Sp = total surface area of the pistons whose cylinders are connected to the same gas manifold
Vp = mean velocity of each piston
Ve = velocity of the gases at the downstream end of the gas manifold
P2' = density of the intake air
P5 = density of the exhaust gases
a = flow coefficient of the engine (between 0.5 and 1.2);

the Mach number of the flow of the gases at the downstream end of the manifold being:

$$m = \frac{Ve}{a5},$$

in which $$a5 = \sqrt{1.33 \times 287 \times T5}$$

with
T5 = exhaust temperature in °K.
If T5 = 873° K. (600° C.), a5 = 577 m/s,
m = 0.3 and Ve = 173 m/s C—The regulation of the order of ignition of the various work chambers grouped together on the same gas manifold so as to organize an injection of a quantity of motion coming from each work chamber, which is as regular as possible and the least disturbing of the exhaust of one chamber on the other.

D—A connection 33 which is as simple and as short as possible between the downstream end of the manifold (in the direction of flow of the gases) and the inlet of the turbine 29 in order to avoid as far as possible the total pressure drops of the flow at high speed, either by friction or by changes in the path (bend, or sudden variation in the section); by way of example, the total pressure drop caused by friction of a flow of gas having a Mach number equal to 0.7 is on the order of 1% per unit length equal to the diameter of the manifold.

E—The optional interposition, between the downstream end of the gas manifold and the inlet of the turbine, of a diffuser capable of slowing down the flow to a Mach number on the order of 0.25.

But in view of the fact that the flow will then again be accelerated up to the Mach number on the order of 1 (usually in a fixed ring of nozzles termed distributor) before entering the turbine wheel, it is clear that it may be preferable to eliminate this slowing down in the diffuser and subsequent acceleration in the distributor by replacing said characteristic E by the following:

E'—The organisation of the housing for the entry of the gases to the turbine to maintain substantially constant the speed of the gases until they enter the expansion wheel of the turbine.

It will be noted that the advanced opening of the exhaust valve, when the engine according to the invention has a low power mode of operation—an advance of 60° in the examples indicated hereinbefore resulting in the commencement of the opening of the exhaust valve (EO) 120° before the BDC, i.e. well before the end of the expansion stroke of the piston—presents many advantages such as the following:

as the pressure and the temperature prevailing in the work chamber upon the opening of the exhaust valve and the mass of discharged gas are higher, the exhaust blast will be more active: the driving and the acceleration of the supercharging turbine will be very much improved and this more particularly so if the exhaust system is arranged in accordance with the second embodiment of the invention described hereinbefore.

for the same reason, the self-scavenging of the twostroke engine will be improved at low operating powers of the engine;

for a given power on the main shaft, the reduction in expansion travel results in an increased consumption of fuel and therefore an increase in the temperature of the gases leaving the work chambers, which factor is also favorable as concerns the driving of the supercharging turbine.

The direct connection 33 between the rectilinear manifold and the inlet of the turbine 29 moreover permits, at the lowest operating speeds, advantage to be taken from the pulses due to the exhaust blasts in the absence of any ejection or inertia effect for producing, owing to the turbo-compressor unit, a ventilation of the work chambers which is sufficient to achieve a good scavenging.

The invention can of course be subject to many modifications and the various intake and exhaust timing diagrams set forth hereinbefore have been mentioned essentially by way of examples, it being possible to subject these diagrams to variations within the scope of the invention.

I claim:

1. An internal combustion engine operating on a twostroke cycle comprising:
    at least one work chamber including a cylinder and a reciprocating piston in said cylinder, said work chamber having a predetermined compression ratio;
    an engine shaft which rotates in synchronization with the movement of said piston and defining an angular position of a cycle of operation of said work chamber;
    an intake means for allowing the introduction of fresh air into said work chamber when in an open position and for preventing any fluid flow through said intake means when in a closed position, said intake means operating in synchronization with the rotation of said engine shaft;
    an exhaust means for allowing the removal of exhaust gases from said work chamber when in an open position and for preventing any fluid flow through said exhaust means when in a closed position, said exhaust means operating in synchronization with the rotation of said engine shaft;
    a supercharger including (a) a turbine having a gas inlet which communicates with the exhaust gases from said work chamber to drive said turbine, and (b) a compressor which is mechanically driven by said turbine and which has an air outlet which communicates with said intake means;
    a sensing means for sensing at least one power-dependent parameter of the engine during operation and for determining when the engine is operating at one of start up and low power in contrast to a normal operation; and
    a control means for controlling a normal opening of said intake means and of said exhaust means as a function of the angular position of said rotating engine shaft during the normal operation of the engine, said control means further being responsive to the sensing of said sensing means of the start up or low power operation of the engine to advance a beginning of the opening of said intake means relative to a beginning of opening of said intake means during normal operation while maintaining the opening of said intake means subsequent to a beginning of the opening of said exhaust means whereby a sufficient quantity of fresh air is supplied by said supercharger to said intake means during all operations.

2. An engine according to claim 1, characterized in that, when starting up and when operating at low power, a stagger between the beginning of the opening of the intake means and a beginning of the opening of the exhaust means is at least equal to 30° of the cycle of operation of said work chamber.

3. A process for starting up an engine according to claim 1, characterized in that, with the engine supercharged by a supercharger, the supercharger is speeded up prior to the starting up of the engine.

4. An engine according to claim 1, characterized in that the power-dependent parameter relating to the operation of the engine is selected from one of the following:
    a value of a supercharging pressure of the fresh air supplied by said compressor,
    a quantity of fuel introduced per cycle in said at least one work chamber,
    a speed of rotation of said engine shaft,
    an exhaust temperature of the exhaust gases, and
    an effective value of a difference in pressure between the fresh air and exhaust gases;
and wherein said sensing means detects a value of the parameter.

5. An engine according to claim 1, characterized in that the control means is of a mechanical type and is directly driven by the engine shaft through a camshaft, and further including a mechanical regulating means for modifying the angular positions of opening of said intake means and said exhaust means.

6. An engine according to claim 1, characterized in that the control means further modifies the angular position for a closure of the intake and exhaust means in response to the sensed start up or low power operation.

7. An engine according to claim 1, characterized in that, when said control means advances the opening of the intake and exhaust means (7, 9), the intake means (7) is open principally during at least a part of a stroke of said piston relating to an increasing volume of the work chamber for producing an aspiration of fresh air.

8. An engine according to claim 7, characterized in that, when said control means advances the opening of the intake and exhaust means, the compression ratio corresponds to the whole compression stroke of the piston.

9. An engine according to claim 7, characterized in that the opening position of the intake means is in a middle of the stroke of the piston.

10. An engine according to claim 9, characterized in that said control means always maintains a difference in the openings of the intake and exhaust means.

11. An engine according to claim 7, characterized in that said control means opens the intake and exhaust means (7, 9) simultaneously during a part of the cycle of the work chamber; and further comprising an exhaust system for the exhaust gases including a unidirectional means for limiting a possible reflux of exhaust gases from the exhaust system.

12. An engine according to claim 11, characterized in that said unidirectional means comprises mechanical check means.

13. An engine according to claim 11, characterized in that said unidirectional means comprises fixed exhaust pipes of sufficient length to utilize an inertia effect of the exhaust gases forming a column in motion in the exhaust system.

14. An engine according to claim 11, characterized in that it comprises more than three work chambers and an ejection means employing an ejection effect produced by an exhaust gases pulse coming from a work chamber on an emptying of another work chamber in a scavenging situation.

15. An engine according to claim 14, characterized in that it comprises exhaust pipes ensuring a communication between an exit of the exhaust gases from the work chamber and a gas manifold and having a converging shape along a portion of a nozzle whose outlet is oriented in a same direction as a gas flow in the gas manifold.

16. An engine according to claim 13, characterized in that the exhaust pipes open out in a same direction as a flow of the exhaust gases in a gas manifold and in a concentric manner relative to the latter.

17. An engine according to claim 1, characterized in that the exhaust system comprises a direct connection between the exhaust means (9) and a wheel of the turbine (29) for driving the compressor of the supercharger solely by exhaust blast pulses of the exhaust gases at low power.

18. An engine according to claim 15, characterized in that a passage section of the gas manifold is substantially constant and sufficiently small so that, at normal operation, a rate of flow of the exhaust gases at a downstream end of the manifold exceeds a Mach number of 0.4.

19. A supercharged engine according to claim 18, characterized in that a downstream outlet of the gas manifold communicates with the gas inlet of the turbine of the supercharger through a diffuser which lowers the rate of flow to a Mach number of less than 0.4.

20. An engine according to claim 17, characterized in that a downstream outlet of the gas manifold directly communicates with the gas inlet of the turbine of the supercharger which turbine has a gas distribution volute so arranged that the rate of flow of the exhaust gases is not markedly reduced between an outlet of the manifold and an introduction into a rotor of the turbine.

21. A process for operating an engine according to claim 1, characterized in that:
 (a) when the parameter has a value which corresponds to the normal operation of the engine, the engine operates in a known manner in accordance with a two-stroke cycle which comprises:
  a compression-combustion-expansion stage during which the intake and exhaust means (7, 9) are in the closed position,
  a pulsating exhaust period at an end of the expansion stage during which only the exhaust means (9) is open,
  a scavenging period during which the intake means (7) and the exhaust means (9) are simultaneously open an the exhaust gases are at least partly replaced by fresh air under action of a difference of pressures, on average positive, prevailing on each side of the work chamber,
 (b) on the other hand, when the parameter of operation has values which correspond to one of start up and low power, in respect of which the engine would be incapable of operating suitably, an angular position of the opening of the intake and exhaust means (7, 9) is advanced relative to a position of maximum volume of the work chamber so that a communication of the latter with an intake system of the engine occurs during at least a part of a period of increasing volume of the work chamber.

22. A process according to claim 21, characterized in that the angular positions of the opening of said intake and exhaust means are advanced so as to utilized principally a part of the stroke of increasing volume of the work chamber in the course of an inspiration of the fresh air.

23. A process according to claim 22, characterized in that unidirectional means are then employed in exhaust pipes, so that no substantial reverse flow occurs from the exhaust pipes to the work chamber.

24. A process according to claim 22, characterized in that the angular positions of the intake and exhaust means closure and opening are staggered in the vicinity of each other so as to avoid a state of simultaneous opening of the intake means (7) and exhaust means (9).

25. A process according to claim 21, characterized in that all of the positions of the opening and the closure of the intake and exhaust means are angularly staggered by an angular phase shift of a camshaft.

26. A process according to claim 21, in which the angular positions of the closings of the intake and exhaust means are further away from bottom dead centre than the angular positions of the openings of said intake and exhaust means.

27. A method of controlling a two-stroke internal combustion engine that includes at least one cylinder, a piston coupled to a crankshaft and disposed to reciprocate in said cylinder, intake means for admitting combustion air into said cylinder, exhaust means for releasing exhaust gases from said cylinder, and means for operating said intake and exhaust means in synchronism with a rotation of said crankshaft, said controlling method controlling timing of operation of said intake and exhaust means for relative to the rotation of said crankshaft during operation of said engine and comprising the steps of:

(a) monitoring at least one operation-dependent parameter of said engine during operation thereof, (b) responsive to said parameter, sensing an operating condition of said engine differing from a normal operation, the operating condition being characterized by a low pressure differential between said intake and exhaust means across said cylinder at which pressure of combustion air at said intake means is insufficient to scavenge exhaust gases from said cylinder through said exhaust means, and (c) upon sensing of said operating condition, advancing operation of both said intake and exhaust means such that both said intake and said exhaust means open earlier relative to rotation of said crankshaft than during the normal operation of said engine.

28. The method set forth in claim 27 wherein said step (c) comprises the step of:

(c1) opening said exhaust means and said intake means in succession during an expansion stroke of said piston within said cylinder.

29. The method set forth in claim 28 wherein said step (c) comprises the additional step of:

(c2) closing said exhaust means prior to opening said intake means during said expansion stroke such that said piston functions during said expansion stroke following opening of said intake means to aspirate combustion air into said cylinder through said intake means.

30. The method set forth in claim 28 wherein said step (c) comprises the steps of:

(c2) maintaining said intake and said exhaust means open simultaneously, and (c3) directing the exhaust gases through said exhaust means in such a way as to prevent reflux of the exhaust gases into said cylinder.

31. A method of controlling a two-stroke internal combustion engine that includes at least one cylinder, a piston coupled to a crankshaft and disposed to reciprocate in said cylinder in successive expansion and compression strokes, intake means for admitting combustion air into said cylinder, exhaust means for releasing exhaust gases from said cylinder, and means for operating said intake and exhaust means in synchronism with a rotation of said crankshaft, said controlling method controlling timing of said intake and exhaust means relative to rotation of said crankshaft during operation of said engine and comprising the steps of:

(a) monitoring at least one operation-depending parameter of said engine during operation thereof, (b) responsive to said parameter, distinguishing between a first engine operating condition at which a pressure differential across said cylinder between said intake and exhaust means is sufficient to substantially scavenge exhaust gases from said engine when both of said intake and exhaust means are open, and a second engine operating condition in which said pressure differential is insufficient to scavenge said gases, (c) upon detection of said first engine operating condition, opening said exhaust and intake means in succession during a latter portion of said expansion stroke, and closing said intake and exhaust means during said compression stroke, and (d) upon detection of said second operating condition, advancing timing of at least said exhaust means to open said exhaust means earlier in said expansion stroke than during said first operating condition, such that greater temperature and pressure of exhaust gases in said cylinder when said exhaust means is opened in said second operating condition as compared with said first operating condition promotes and assists exhaustion of the gases through said exhaust means.

32. The method set forth in claim 31 wherein said exhaust means is opened in said step (c) during a second half of said expansion stroke, and wherein said exhaust means is opened in said step (d) during the first half of said expansion stroke.

33. The method set forth in claim 31 wherein said step (d) comprises the step of advancing timing of both said exhaust and intake means to open in succession earlier in said expansion stroke than during said first operating condition.

34. The method set forth in claim 33 wherein an angular increment of rotation of said crankshaft between successive opening of said exhaust and intake means during said expansion stroke remains substantially constant between said first and second operating conditions.

35. The method set forth in claim 33 wherein said step (d) comprises the step of closing said exhaust means while leaving said intake means open during said expansion stroke such that reciprocation of said piston in said cylinder aspirates combustion air through said intake means.

36. The method set forth in claim 33 wherein said step (d) comprises the steps of:

(d1) maintaining said intake and said exhaust means open simultaneously, and (d2) directing the exhaust gases through said exhaust means in such a way as to prevent reflux of the exhaust gases into said cylinder.

37. The method set forth in claim 31 wherein said engine further includes means coupling said intake and exhaust means to aid crankshaft such that said intake and exhaust means open and close at predetermined intervals with respect to rotation of said crankshaft, and wherein said step (d) comprises the step of controlling said coupling means so as to advance timing of said intake and exhaust means while maintaining said intervals constant.

38. A method of operating a two-stroke cycle internal combustion engine having at least one work chamber including a cylinder and a piston reciprocable in said cylinder and operably coupled to a crankshaft of the engine, intake means for admitting combustion air into said work chamber when in an open condition and for preventing any fluid flow therethrough when in a closed condition, exhaust means for allowing removal of exhaust gases from said work chamber when in an open condition and for preventing any fluid flow therethrough when in a closed condition, and control means for operating said intake and exhaust means in synchronism with rotation of said crankshaft and being operable to vary during operation of the engine at least one of the opening and closure timing of operation of at least one of said intake and exhaust means as a function of the angular position of said crankshaft and associated travel position of said piston, said method comprising the steps of:
(a) sensing at least one parameter of operation of the engine capable of assuming at least two value, one of said two values corresponding to an operation of the engine during which the magnitude of the pressure difference between an intake side of the chamber and an exhaust side remains sufficiently positive to ensure good operation of the engine so that the same is capable of running in the usual manner of a conventional two-stroke cycle engine under normal operating conditions, the other of said two values corresponding to a condition in which said pressure difference falls below said sufficiently positive magnitude such that the engine would be incapable of suitably operating, and
(b) operating said control means during engine operation in response to said one sensed parameter to vary said timing as a function of said two parameter values between a retarded and advanced relationship corresponding respectively to said one and said other of said two parameter values so as to obtain at all operating conditions a sufficient quantity of fresh air into the work chamber.

39. The method set forth in claim 38 wherein in said step (a) said one parameter is selected from the group consisting of:
(1) a value of a supercharging pressure of a supercharger for said two-stroke cycle engine,
(2) a quantity of fuel introduced per cycle into the work chamber,
(3) a speed of rotation of the crankshaft of the engine,
(4) a temperature prevailing in the exhaust gases removed from the work chamber, and
(5) an effective value of a difference in pressure between the intake and exhaust sides of the work chamber.

40. The method as set forth in claim 39 wherein in the step (b) said advanced timing causes an opening operation of said intake and exhaust means in advance of a maximum volume of the work chamber and a closure operation of said intake means in advance of a minimum volume of the work chamber.

41. The method as set forth in claim 40 wherein in the step (b) the control means is operated to vary said timing in a sudden manner when the sensed parameter passes through a predetermined threshold value.

42. The method as set forth in claim 40 wherein in the step (b) the control means is operated to vary said timing in accordance with a generally continuous function of said sensed parameter for progressively varying said timing between said retarded and advanced relationships.

43. A two-stroke internal combustion engine comprising:
at least one cylinder;
a piston coupled to a crankshaft and disposed to reciprocate in said cylinder;
intake means for admitting combustion air into said cylinder;
exhaust means for releasing exhaust gases from said cylinder;
operating means for operating said intake and exhaust means in synchronism with a rotation of said crankshaft; and
a timing means for controlling a timing of operation of said intake and exhaust means relative to the rotation of said crankshaft during operation of said engine, said timing means including:
(a) a monitoring means for monitoring at least one operation-dependent parameter of said engine during operation thereof,
(b) a sensing means, responsive to said parameter, for sensing an operating condition of said engine differing from a normal operation, the operating condition being characterized by a low pressure differential between said intake and exhaust means across said cylinder at which pressure of combustion air at said intake means is insufficient to scavenge exhaust gases from said cylinder through said exhaust means, and
(c) an advancing means for advancing operation of both said intake and exhaust means upon sensing of said operating condition such that both said intake and said exhaust means open earlier relative to rotation of said crankshaft than during the normal operation of said engine.

44. The engine set forth in claim 43 wherein said advancing means (c) opens said exhaust means and said intake means in succession during an expansion stroke of said piston within said cylinder.

45. The engine set forth in claim 44 wherein said advancing means (c) closes said exhaust means prior to opening said intake means during said expansion stroke such that said piston functions during said expansion stroke following opening of said intake means to aspirate combustion air into said cylinder through said intake means.

46. The engine set forth in claim 44 wherein said advancing means (c) maintains said intake and said exhaust means open simultaneously such that the exhaust gases are directed through said exhaust means in such a way as to prevent reflux of the exhaust gases into said cylinder.

47. A two-stroke internal combustion engine comprising:
at least one cylinder;
a piston coupled to a crankshaft and disposed to reciprocate in said cylinder in successive expansion and compression strokes;
intake means for admitting combustion air into said cylinder;
exhaust means for releasing exhaust gases from said cylinder;
a timing means for controlling a timing of said intake and exhaust means in synchronism with and relative to a rotation of said crankshaft during operation of said engine, said timing means including.
(a) a monitoring means for monitoring at least one operation-depending parameter of said engine during operation thereof,
(b) a distinguishing means, responsive to said parameter, for distinguishing between a first engine operating condition at which a pressure differential across said cylinder between said intake and exhaust means is sufficient to substantially scavenge exhaust gases from said engine when both of said intake and exhaust means are open, and a second engine operating condition in which said pressure differential is insufficient to scavenge said gases,
(c) a moving means for, upon detection of said first engine operating condition, opening said exhaust and intake means in succession during a latter portion of said expansion stroke, and closing said intake and exhaust means during said compression stroke, and (d) an advancing means for advancing timing upon detection of said second operating condition of at least said exhaust means to open said exhaust means earlier in said expansion stroke than during said first operating condition, such that greater temperature and pressure of exhaust gases in said cylinder when said exhaust means is opened in said second operating condition as compared with said first operating condition promotes and assists exhaustion of the gases through said exhaust means.

48. The engine set forth in claim 47 wherein said exhaust means is opened by said moving means (c) during a second half of said expansion stroke, and wherein said exhaust means is opened by said advancing means (d) during the first half of said expansion stroke.

49. The engine set forth in claim 47 wherein said advancing means (d) advances the timing of both said exhaust and intake means to open in succession earlier in said expansion stroke than in said first operating condition.

50. The engine set forth in claim 49 wherein said advancing means maintained an angular increment of rotation of said crankshaft between successive opening of said exhaust and intake means during said expansion stroke substantially constant between said first and second operating conditions.

51. The engine set forth in claim 49 wherein said advancing means (d) closed said exhaust means while leaving said intake means open during said expansion stroke such that reciprocation of said piston in said cylinder aspirates combustion air through said intake means.

52. The engine set forth in claim 49 wherein said advancing means (d) maintains said intake and said exhaust means open simultaneously such that the exhaust gases are directed through said exhaust means in such a way as to prevent reflux of the exhaust gases into said cylinder.

53. The method set forth in claim 47 wherein said engine further includes a coupling means for coupling said intake and exhaust means to said crankshaft such that said intake and exhaust means open and close at predetermined intervals with respect to rotation of said crankshaft, and wherein said advancing means (d) includes a control means for controlling said coupling means so as to advance timing of said intake and exhaust means while maintaining said intervals constant.

54. A two-stroke cycle internal combustion engine comprising:
a crankshaft;
at least one work chamber including a cylinder and a piston reciprocable in said cylinder and operably coupled to said crankshaft;
an intake means for admitting combustion air into said work chamber when in an open condition and for preventing any fluid flow therethrough when in a closed condition;
an exhaust means for allowing removal of exhaust gases from said work chamber when in an open condition and for preventing any fluid flow therethrough when in a closed condition;
a control means for operating said intake and exhaust means in synchronism with rotation of said crankshaft and being operable to vary during operation of the engine of the engine at least one of the opening and closure timing of operation of at least one of said intake and exhaust means as a function of the angular position of said crankshaft and associated travel position of said piston, said control means including (a) a sensing means for sensing at least one parameter of operation of the engine capable of assuming at least two values, one of said two values corresponding to an operation of the engine during which the magnitude of the pressure difference between an intake side of the chamber and an exhaust side remains sufficiently positive to ensure good operation of the engine so that the same is capable of running in the usual manner of a conventional two-stroke cycle engine under normal operating conditions, the other of said two values corresponding to a condition in which said pressure difference falls below said sufficiently positive magnitude such that the engine would be incapable of suitably operating, and (b) a timing means for operating said control means during engine operation in response to said one sensed parameter to vary said timing as a function of said two parameter values between a retarded and advanced relationship corresponding respectively to said one and said other of said two parameter values so as to obtain at operating conditions a sufficient quantity of fresh air into the work chamber.

55. The engine set forth in claim 54 wherein said one parameter of said sensing means (c) is selected from the group consisting of:
a value of a supercharging pressure of a supercharger for said two-stroke cycle engine,
a quantity of fuel introduced per cycle into the work chamber,
a speed of rotation of said crankshaft of the engine,
a temperature prevailing in the exhaust gases removed from the work chamber; and
an effective value of a difference in pressure between the intake and exhaust sides of the work chamber.

56. The engine set forth in claim 55 wherein said timing means causes an opening operation of said intake and exhaust means in advance of a maximum volume of the work chamber and a closure operation of said intake means in advance of a minimum volume of the work chamber.

57. The engine set forth in claim 56 wherein said timing means varies said timing in a sudden manner when the sensed parameter passes through a predetermined threshold value.

58. The engine set forth in claim 56 wherein said timing means varies said timing in accordance with a generally continuous function of said sensed parameter for progressively varying said timing between the retarded and advanced relationships.

* * * * *